(12) United States Patent
Eom

(10) Patent No.: US 6,172,780 B1
(45) Date of Patent: Jan. 9, 2001

(54) LASER SCANNING APPARATUS

(75) Inventor: Yoon-seop Eom, Suwon (KR)

(73) Assignee: Samsung Electronics Co., Ltd., Kyungki-Do (KR)

(*) Notice: Under 35 U.S.C. 154(b), the term of this patent shall be extended for 0 days.

(21) Appl. No.: 09/272,322

(22) Filed: Mar. 19, 1999

(30) Foreign Application Priority Data

Mar. 24, 1998 (KR) .................................................. 98-10157
Mar. 24, 1998 (KR) .................................................. 98-10159

(51) Int. Cl.[7] ............................ G02B 26/10; G02B 5/32; G02B 26/08; B41J 15/14; B41J 24/435
(52) U.S. Cl. .......................... 359/17; 359/18; 359/196; 347/241; 347/243; 347/263
(58) Field of Search .................................. 359/17, 18, 205, 359/196; 347/241, 242, 245, 263

(56) References Cited

U.S. PATENT DOCUMENTS 4,165,464 * 8/1979 Ikeda et al. .............................. 359/18
5,064,258 * 11/1991 Inokuchi et al. ........................ 359/17

* cited by examiner

*Primary Examiner*—Audrey Chang
(74) *Attorney, Agent, or Firm*—Sughrue, Mion, Zinn, Macpeak & Seas, PLLC

(57) ABSTRACT

A laser scanning apparatus including an optical source installed on a main frame, a scan disk which is rotatably installed on the main frame and has diffraction patterns formed thereon for deflecting a beam emitted from the optical source in a predetermined direction to achieve a normal light path, and a means for shielding an abnormal beam that is emitted from the optical source and diffracted or reflected off the normal light path by the scan disk.

13 Claims, 3 Drawing Sheets

LASER SCANNING APPARATUS

BACKGROUND OF THE INVENTION

1. Field of the Invention

The present invention relates to a laser scanning apparatus, and more particularly, to a laser scanning apparatus in which a beam emitted from an optical source is deflected by a scan disk having a plurality of diffraction patterns formed thereon, and projected onto a scanning object such as a photoreceptor drum via a light path changing unit.

2. Description of the Related Art

FIG. 1 shows a laser scanning apparatus adopted in a conventional electrophotographic printer. The laser scanning apparatus includes an optical source 11 and a scan disk 14. Reference numeral 12 denotes a cylindrical lens, and reference numerals 13, 15 and 16 denote optical elements for changing a light path and controlling the size of a beam. The scan disk 14 is segmented into a plurality of areas on which diffraction patterns for deflecting an incident beam are formed.

A beam emitted from the optical source 11 is deflected by the scan disk 14 which is rotated by a motor (not shown), and projected onto a photoreceptor drum 17 via the optical elements 15 and 16. The light beam repeatedly scans the photoreceptor drum 17 corresponding to the diffraction patterns formed on the scan disk 14.

In the laser scanning apparatus, the scan disk 14 deflects an incident beam in a desired direction, but transmits or reflects some of the incident beam in an undesired direction. The traveling path of the beam emitted from the scan disk 14 in the undesired direction may be changed and finally reach the photoreceptor drum 17 in the laser scanning apparatus. This causes an image forming error.

High-speed rotation of the scan disk 14 is required to increase the scanning speed, which generates noise.

SUMMARY OF THE INVENTION

To solve the above problems, it is an objective of the present invention to provide a laser scanning apparatus including means for absorbing and blocking abnormal beams not diffracted to a normal light path by a scan disk.

Accordingly, to achieve the above objective, there is provided a laser scanning apparatus comprising: an optical source installed on a main frame; a scan disk which is rotatably installed on the main frame and has diffraction patterns formed thereon for deflecting a beam emitted from the optical source in a predetermined direction to achieve a normal light path; and a means for shielding an abnormal beam that is emitted from the optical source and diffracted or reflected off the normal light path by the scan disk.

The light shielding means includes an optical absorbing member for absorbing and blocking the abnormal beam.

The light shielding means further includes a shielding plate on which a window is formed to pass only a beam deflected to the normal light path by the scan disk.

According to another aspect of the present invention, the light shielding means includes a shielding cap which is installed over the main frame to seal the optical source and the scan disk and has a window for passing only a beam deflected to the normal light path by the scan disk.

BRIEF DESCRIPTION OF THE DRAWINGS

The above objective and advantage of the present invention will become more apparent by describing in detail preferred embodiments thereof with reference to the attached drawings in which.

DESCRIPTION OF THE PREFERRED EMBODIMENTS

Figure 1:
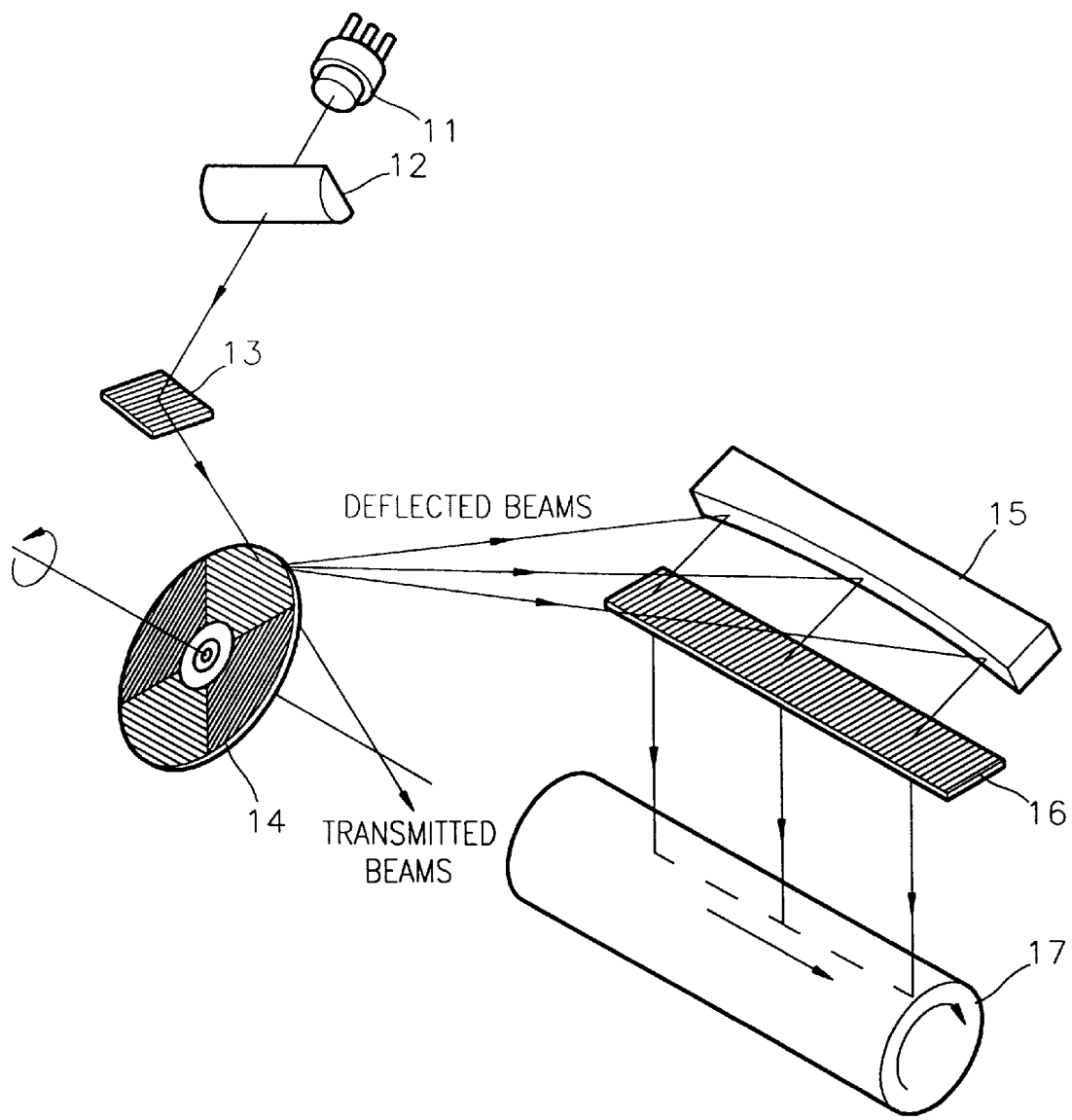
FIG. 1 is a perspective view illustrating the configuration of a general laser scanning apparatus.
Figure 2:
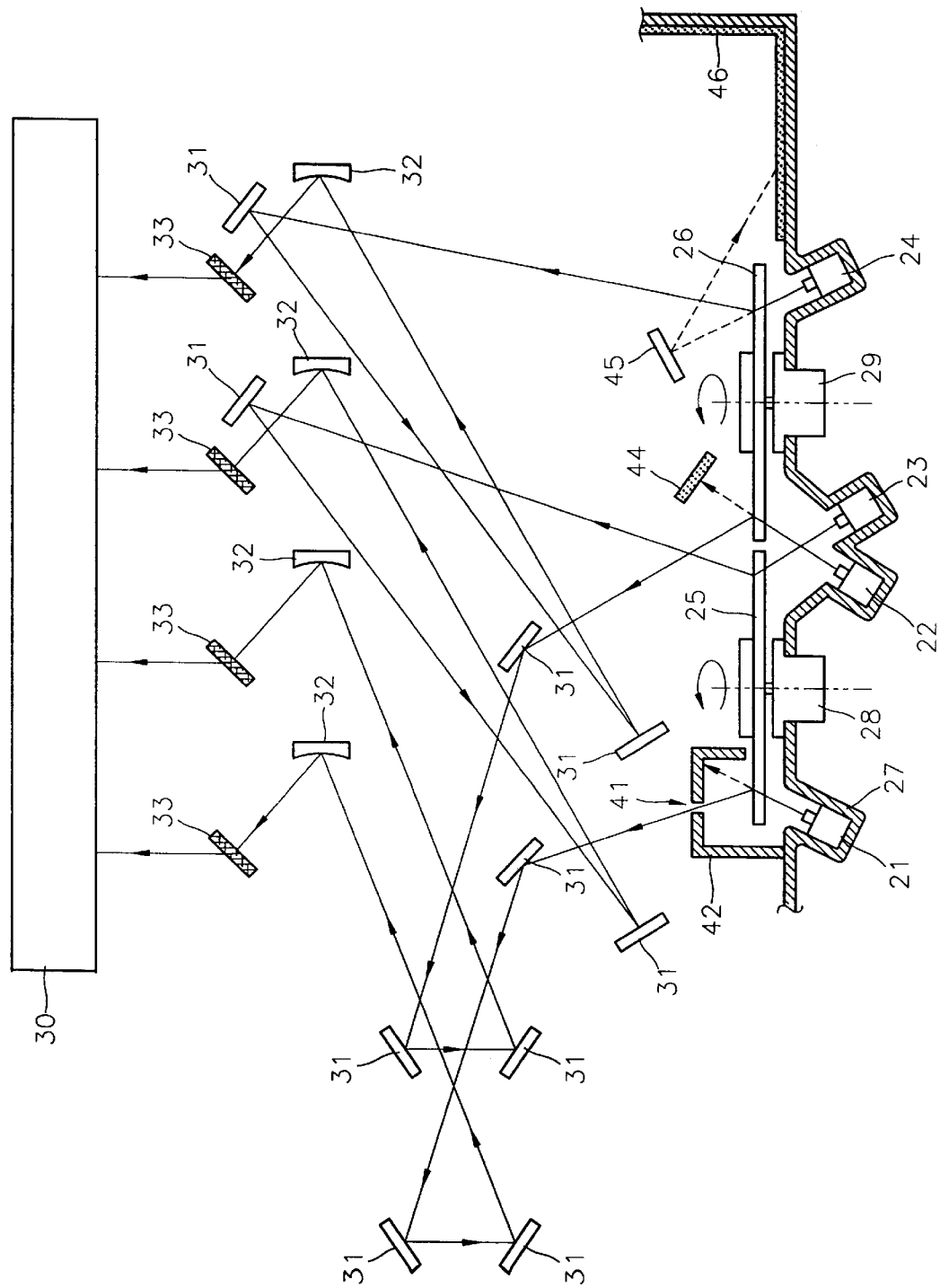
FIG. 2 illustrates a laser scanning apparatus according to an embodiment of the present invention.

Referring to FIG. 2 showing a laser scanning apparatus according to an embodiment of the present invention, two scan disks 25 and 26, and four optical sources 21, 22, 23 and 24 for irradiating beams to the scan disks 25 and 26 are installed on a main frame 27. The scan disks 25 and 26 are rotated by motors 28 and 29, respectively, and diffraction patterns for deflecting incident beams are formed on the scan disks 25 and 26. Beams emitted from the optical sources 21, 22, 23, and 24 are incident upon the different diffraction patterns on the scan disks 25 and 26. The optical sources 21, 22, 23 and 24 are independently driven so as to correspond to, for example, yellow, magenta, cyan, and black, and thus can achieve color printing.

The beams emitted from the optical sources 21, 22, 23, and 24 and passed through the scan disks 25 and 26 are incident upon a scan object 30 via light path changing units, i.e., a plane mirror 31, a concave mirror 32, and a lens 33. Preferably, the lens 33, a holographic optical element, changes the path of incident beams and concurrently focuses the incident beams. The scanning object 30 includes not only a photoreceptor drum and a photoreceptor belt but also a display panel adopting a fluorescent film.

In the operation of the laser scanning apparatus configured as above, beams emitted from the optical sources 21, 22, 23, and 24 and incident upon the scan disks 25 and 26 are deflected by the diffraction patterns formed on the scan disks 25 and 26, and then are projected onto the scan object 30 via the plane mirror 31, the concave mirror 32, and the lens 33 indicated by solid lines in FIG. 2. Some of the beams (indicated by dotted lines) emitted from the optical sources 21, 22, 23, and 24 are abnormal beams which are reflected by the scan disks 25 and 26 or pass straight therethrough, or which are not deflected to normal light paths. According to the present invention, these abnormal beams are removed by a light shielding means.

The light shielding means includes a shielding plate 42 and optical absorbing members 44 and 46. Here, the shielding plate 42 has a window 41 for passing only beams deflected toward the plane mirror 31, the light path changing means, by the scan disks 25 and 26. The optical absorbing members 44 and 46 directly receive and absorb the abnormal beams. The shielding plate 42 is manufactured of a material which can absorb and destroy beams, e.g., a black resin having a high absorption factor.

The optical absorbing member 46 can be installed on the main frame 27. In this case, the light shielding means includes a reflecting mirror 45 for reflecting the abnormal beams to the optical absorbing member 46. This light shielding means has various applications according to the paths of the abnormal beams desired to be removed.

Figure 3:
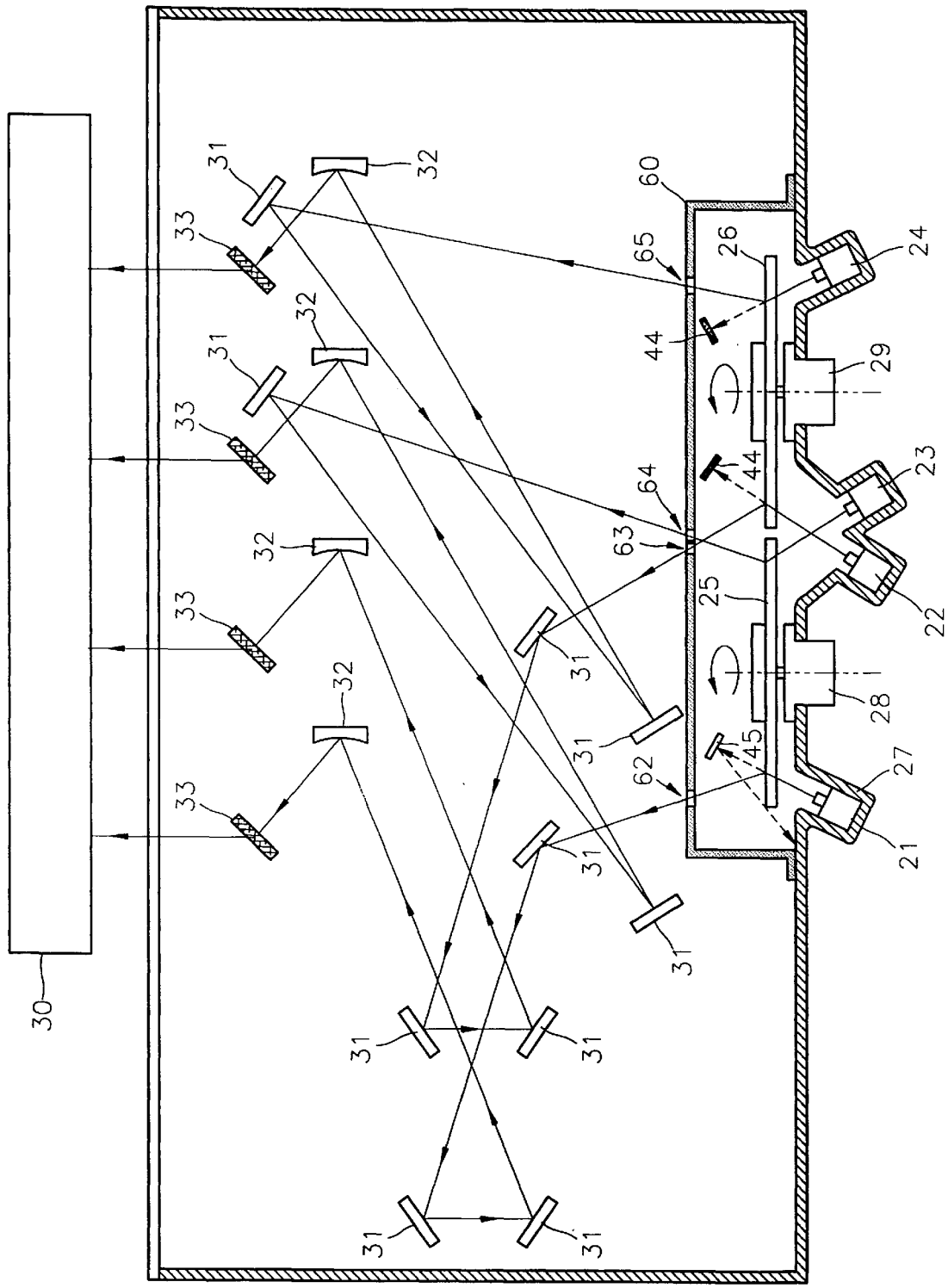
FIG. 3 illustrates a laser scanning apparatus according to another embodiment of the present invention.

FIG. 3 illustrates a laser scanning apparatus according to another embodiment of the present invention. Members functioning in the same manner as those in FIG. 2 are represented by the same reference numerals.

Referring to FIG. 3, a shielding cap 60 is installed over the main frame 27 to seal the scan disks 25 and 26 and the optical sources 21, 22, 23, and 24 mounted on the main frame 27. The shielding cap 60 has windows 62, 63, 64 and 65 for passing only beams that are emitted from the optical sources 21, 22, 23, and 24 and deflected in a desired direction, i.e., toward the plane mirror 31, by the scan disks 25 and 26. Thus, abnormal beams deflected in an undesired direction by the scan disks 25 and 26, among the beams emitted from the optical sources 21, 22, 23, and 24, can all be blocked by the shielding cap 60. Also, the shielding cap 60 can effectively prevent noises generated by the rotation of the scan disks 25 and 26.

Preferably, a reflecting mirror 45 for changing the paths of the abnormal beams toward the wall of the shielding cap 60, or an optical absorbing member 44 for directly absorbing the abnormal beams can be further installed inside the shielding cap 60.

According to the laser scanning apparatus of the present invention, abnormal beams emitted in an undesired direction from scan disks are removed to prevent them from reaching a scanning object. Thus, image formation errors of the scanning object can be prevented. Also, noises caused by the rotation of the scan disks can be blocked.

What is claimed is:

1. A laser scanning apparatus comprising:

a housing;

an optical source installed on a main frame of said housing;

a scan disk which is rotatably installed on said main frame of said housing and has diffraction patterns formed thereon for deflecting a beam emitted from said optical source in a predetermined direction to achieve a normal light path; and means for shielding an abnormal beam that is emitted from said optical source and diffracted or reflected off the normal light path by said scan disk, the light shielding means being installed within the laser scanning apparatus housing, and including an optical absorbing member disposed within the interior of the laser scanning apparatus housing for absorbing and blocking the abnormal beam, said light shielding means further including a reflecting mirror for changing the path of said abnormal beam emitted from said scan disk toward said optical absorbing member.

2. The laser scanning apparatus as claimed in claim 1, wherein the light shielding means includes a shielding plate within said housing, containing a window to pass only a beam deflected to the normal light path by said scan disk.

3. The laser scanning apparatus as claimed in claim 1, wherein the light shielding means includes a shielding cap which is installed over said main frame within said housing, to seal said optical source and said scan disk and has a window for passing only a beam deflected to the normal light path by the scan disk.

4. The laser scanning apparatus as claimed in claim 3, wherein an optical absorbing member for directly absorbing and blocking the abnormal beam is installed inside said shielding cap.

5. The laser scanning apparatus as claimed in claim 4, wherein a reflecting mirror for changing the path of the abnormal beam reflected or diffracted by said scan disk toward said optical absorbing member is further installed inside said shielding cap.

6. A laser scanning apparatus comprising:

a housing;

a plurality of optical sources installed on a main frame of said housing;

a plurality of scan disks which are rotatably installed on said main frame of said housing and have diffraction patterns thereon for deflecting beams emitted from said optical sources in a predetermined direction to achieve normal light paths; and a light shield installed within the laser scanning apparatus housing, for preventing abnormal beams that are emitted from said optical sources and diffracted or reflected off the normal light paths by said scan disks from reaching a photoreceptive member, said light shield including an optical absorbing member disposed within the interior of the laser scanning apparatus housing for absorbing and blocking at least one of the abnormal beams, said light shield further including at least one reflecting mirror for changing the path of at least one of the abnormal beams reflected or diffracted from said scan disks toward the optical absorbing member.

7. The laser scanning apparatus as claimed in claim 6, wherein said light shield includes at least one shielding plate within said housing, containing a window to pass only a beam deflected to the normal light path by at least one of said scan disks.

8. The laser scanning apparatus as claimed in claim 6, wherein said light shield includes at least one shielding cap installed over said main frame within said housing, to seal said optical sources and said scan disks, said shielding cap having a plurality of windows for passing only beams deflected to the normal light paths by said scan disks.

9. The laser scanning apparatus as claimed in claim 8, wherein an optical absorbing member, for directly absorbing and blocking at least one of the abnormal beams, is installed inside said shielding cap.

10. The laser scanning apparatus as claimed in claim 9, wherein at least one reflecting mirror for changing the path of at least one of the abnormal beams reflected or diffracted by said scan disks toward said optical absorbing member is further installed inside the shielding cap.

11. A laser scanning apparatus comprising:

at least one optical source installed on a main frame;

at least one scan disk which is rotatably installed on said main frame having diffraction patterns thereon for deflecting a beam emitted from said optical source in a predetermined direction to achieve a normal light path; and a light shield assembly which comprises:

an optical absorbing member for absorbing and blocking an abnormal beam; and at least one reflecting mirror for changing the path of the abnormal beam reflected or diffracted by said scan disk toward the optical absorbing member;

whereby the abnormal beam emitted from said optical source and diffracted or reflected off the normal light path by said scan disk is prevented from reaching a photoreceptive member.

12. A laser scanning apparatus comprising:
a housing;
at least one optical source installed on a main frame of said housing;
at least one scan disk which is rotatably installed on said main frame of said housing having diffraction patterns thereon for deflecting a beam emitted from said optical source in a predetermined direction to achieve a normal light path;
at least one shielding plate within said housing, containing a window to pass only a beam deflected to the normal light path by said scan disk;
an optical absorbing member disposed within the interior of the laser scanning apparatus housing for absorbing and blocking at least one of the abnormal beams; and
at least one reflecting mirror for changing the path of the abnormal beam reflected or diffracted by said scan disk toward the optical absorbing member,
whereby an abnormal light beam emitted from said optical source and diffracted or reflected off the normal light path by said scan disk is prevented from reaching a photoreceptive member.

13. A laser scanning apparatus comprising:
at least one optical source installed on a main frame;
at least one scan disk which is rotatably installed on said main frame having diffraction patterns thereon for deflecting a beam emitted from said optical source in a predetermined direction to achieve a normal light path; and
a light shield assembly which comprises:
at least one shielding cap installed over said main frame to seal said optical source and said scan disk, having a window for passing only a beam deflected to the normal light path by said scan disk; and
an optical absorbing member, for directly absorbing and blocking an abnormal beam, installed inside said shielding cap; and
a reflecting mirror for changing the path of the abnormal beam reflected or diffracted by said scan disk toward said optical absorbing member and which is further installed inside the shielding cap;
whereby the abnormal beam emitted from said optical source and diffracted or reflected off the normal light path by said scan disk is prevented from reaching a photoreceptive member.

* * * * *